United States Patent [19]

Gibbons et al.

[11] E Patent Number: Re. 33,376

[45] Reissued Date of Patent: Oct. 9, 1990

[54] NON-FOIL COMPOSITE STRUCTURES FOR PACKAGING JUICE

[75] Inventors: Charles E. Gibbons; Cynthia L. Tanner; Allan A. Whillock, all of Mobile, Ala.

[73] Assignee: International Paper Company, Purchase, N.Y.

[21] Appl. No.: 434,636

[22] Filed: Nov. 13, 1989

Related U.S. Patent Documents

Reissue of:

[64] Patent No.: 4,789,575
Issued: Dec. 6, 1988
Appl. No.: 55,629
Filed: May 29, 1987

U.S. Applications:

[63] Continuation of Ser. No. 373,964, Jun. 27, 1989, abandoned.

[51] Int. Cl.[5] ..... B65D 85/00

[52] U.S. Cl. ..... 428/34.2; 428/336; 428/345; 428/349; 428/511; 428/516; 428/537.5

[58] Field of Search ..... 428/34.2, 336, 345, 428/349, 511, 516, 537.5

[56] References Cited

U.S. PATENT DOCUMENTS

| | | | |
|---|---|---|---|
| 3,620,435 | 12/1971 | Sogi | 229/3.5 R |
| 3,882,259 | 6/1975 | Nohara et al. | 264/171 |
| 3,972,467 | 8/1976 | Whillock et al. | 229/14 B L |
| 4,082,854 | 4/1978 | Yamada et al. | 426/106 |
| 4,131,581 | 12/1978 | Coker | 260/29.1 R |
| 4,239,826 | 12/1980 | Knott, II et al. | 428/35 |
| 4,248,939 | 2/1981 | Parsons | 428/508 |
| 4,254,169 | 3/1981 | Schroeder | 428/35 |
| 4,261,473 | 4/1981 | Yamada et al. | 215/1 |
| 4,284,671 | 8/1981 | Cancio et al. | 428/35 |
| 4,289,815 | 9/1981 | Lee | 156/244.11 |
| 4,300,969 | 11/1981 | Frydendal | 156/244.11 |
| 4,328,284 | 5/1982 | LePoutre | 428/511 |
| 4,355,721 | 10/1982 | Knott, II et al. | 206/524.2 |
| 4,394,485 | 7/1983 | Adur | 527/74 |
| 4,407,873 | 10/1983 | Christensen et al. | 428/35 |
| 4,407,897 | 10/1983 | Farrell et al. | 428/516 |
| 4,416,944 | 11/1983 | Adur | 428/349 |
| 4,425,410 | 1/1984 | Farrell et al. | 428/516 |
| 4,426,344 | 1/1984 | Dinter et al. | 264/171 |
| 4,464,438 | 7/1984 | Lu | 428/516 |
| 4,464,443 | 8/1984 | Farrell et al. | 428/688 |
| 4,481,262 | 11/1984 | Shida et al. | 428/441 |
| 4,511,610 | 4/1985 | Yazaki et al. | 428/35 |
| 4,521,437 | 6/1985 | Storms | 426/130 |
| 4,525,396 | 6/1985 | Takasa et al. | 428/35 |
| 4,526,823 | 7/1985 | Farrell et al. | 206/438 |
| 4,533,510 | 8/1985 | Nissel | 428/35 |
| 4,533,576 | 8/1985 | Tanahashi et al. | 428/35 |
| 4,537,305 | 8/1985 | Takanashi | 156/244.11 |
| 4,561,920 | 12/1985 | Foster | 428/35 |
| 4,564,541 | 1/1986 | Taira et al. | 428/349 |
| 4,590,126 | 5/1986 | Andersson | 428/412 |
| 4,698,246 | 10/1987 | Gibbons et al. | 428/34.2 |
| 4,701,360 | 10/1987 | Gibbons et al. | 428/34.2 |
| 4,734,331 | 3/1988 | Giles et al. | 428/412 |

FOREIGN PATENT DOCUMENTS

| | | |
|---|---|---|
| 56-87038 | 12/1979 | Japan . |
| 2117536 | 2/1983 | United Kingdom . |

*Primary Examiner*—Edith Buffalow
*Attorney, Agent, or Firm*—Walt Thomas Zielinski; Stewart L. Gitler

[57] ABSTRACT

The present invention relates to a non-foil composite barrier *structure* for an improved container for citrus juices and other liquids. The container utilizes a paperboard barrier laminate for the containment of essential oils and the prevention of losses of vitamin C. Also disclosed is a process of making the laminate. The laminate makes use of [an inner] *a buried* barrier layer of a heat-sealable ethylene vinyl alcohol copolymer to enhance the barrier properties of the laminate.

42 Claims, 3 Drawing Sheets

EXISTING COMMERCIAL STRUCTURES

NON-FOIL COMPOSITE STRUCTURES FOR PACKAGING JUICE

Matter enclosed in heavy brackets [ ] appears in the original patent but forms no part of this reissue specification; matter printed in italics indicates the additions made by reissue.

*This is a continuation of copending application Ser. No. 07/373,964 filed on June 27, 1989 now abandoned.*

*BACKGROUND OF THE INVENTION*

The invention relates to heat-sealable barrier laminates for the containment of essential oils and the prevention of loss of vitamin C in paperboard cartons, as well as to a process for making such laminates. More particularly, this invention relates to barrier laminates which are comprised of an improved heat-sealable non-foil composite structure which retains the vitamin C in juice at nutritional-claims levels throughout the normal expected shelf life when the carton/package is made, as well as improving the retention of citrus juice flavor oils therein.

Heat-sealable low-density polyethylenes are well known to be components of current paperboard citrus juice cartons which provide little barrier to absorption and/or transmission of citrus juice essential flavor-/aroma oils. Additionally, it is well known that impermeable materials such as aluminum foil, polar materials such as: polyamides, polyethylene terephthalates, polyvinylidene chlorides,polyvinyl chlorides, etc., and highly crystalline non-polar materials such as high-density polyethylene and polypropylene provide varying degrees of barrier to the absorption and/or transmission of non-polar citrus juice flavor oils such as [d-Limonene,] *d-limonene* et al. However, these materials require a thick liquid contact, low density polyethylene layer for heat sealability as well as an expensive tie layer to provide consistent adhesion between the LDPE and the barrier material. The thick (*1.5* mil) LDPE liquid contact layer [(1.5 mil)] generally required in such cartons also absorbs citrus flavor/aroma oils, with resultant deleterious effects on product quality.

The existing commercial structure for a paperboard carton for juice and similar products has utilized an easily heat-sealable barrier laminate composed of paperboard sandwiched between two layers of low density polyethylene (LDPE). The LDPE is an inexpensive heat-sealable moisture barrier. The conventional structure falters in that the thick LDPE layer absorbs the essential oils of the juice after short periods of time causing integrity decay of heat seals, stress cracking of the layer and allows transmission of the essential oils into the paperboard and to the atmosphere. Additionally, the conventional structure provides virtually no barrier resistance to oxygen, causing the juice to lose vitamin C in large amounts.

One other conventional structure adds two additional layers to the structure identified above, namely a foil layer and an additional LDPE layer. The expensive foil layer increases barrier resistance to the flow of oxygen, while the additional LDPE allows for ultimate heat-sealability of the laminate. The improved conventional structure has poor barrier properties relating to the absorption of essential oils and aromas, since the interior contacting layer is still a thick layer of LDPE.

The object of the present invention is to produce an improved juice packaging heat-sealable laminate material for a juice carton which does not transmit flavor/odor ingredients of citrus and other juices, and *which* exhibits an improved cost-to-performance ratio relative to foil-lined cartons.

SUMMARY OF THE INVENTION

The preferred embodiment of the present invention reveals an improved non-foil composite structure providing a substantial barrier to the loss of vitamin C and an almost complete barrier to the loss of essential flavor oils over the shelf life period of the carton (six weeks) and far beyond the six week period as well. The preferred embodiment comprises from the outer atmosphere exposed surface to the inner surface contacting the essential oils and/or flavors (liquid juice): a first exterior layer of a low density polyethylene polymer; a paperboard substrate; an interior laminate coating comprising a Plexar tie layer an ethylene vinyl alcohol copolymer (EVOH) layer, and another Plexar tie layer, and a second layer of a low density polyethylene polymer coated onto the laminate coating layer of Plexar-/EVOH/Plexar in contact with the juice, rendering the laminate heat-sealable.

A second embodiment of the present invention reveals a non-foil composite structure, providing a substantial barrier to the loss of vitamin C and an almost complete barrier to the loss of essential flavor oils; which comprises from the outer atmosphere exposed surface t the inner surface contacting the essential oils and/or flavors (liquid juice[;] *:* a thin layer of a low density polyethylene polymer, a paperboard substrate, a tie layer of Plexar or ethylene acrylic acid, an interior layer of an ethylene vinyl alcohol copolymer (EVOH), and a thin layer of a low density polyethylene polymer coated onto the interior layer of EVOH, in direct contact with the juice, rendering the laminate heat-sealable.

A third embodiment of the present invention reveals a non-foil composite structure, providing a substantial barrier to the loss of vitamin C and an almost complete barrier to the loss of essential flavor oils[;] which comprises from the outer atmosphere exposed surface to the inner surface contacting the essential oils and/or flavors (liquid juice): a thin layer of a low density polyethylene polymer, a paperboard substrate, an interior layer of an ethylene vinyl alcohol copolymer (EVOH) and a thin layer of a low density polyethylene polymer coated onto the interior layer of EVOH, in direct contact with the liquid, rendering the laminate heat-sealable.

The cartons constructed of the laminate of the present invention enable significant flavor oil retention of the citrus juice contained, and also significant prevention of loss of vitamin C, [resulting] *which results* in a substantial extension of the shelf life thereof and *which* permits replacement of the costly aluminum foil barrier.

The preferred ethylene vinyl alcohol copolymer is sold under the product name EVAL EP resins and is available from EVAL Company of America. The preferred tie layer is [a] Plexar 177 and is available from [USI] *Quantum Chemical* Corporation. *Plexar 177 is a tradename for ethylene-based copolymers modified with functional groups.*

The present invention has produced a suitable container [which has] *with* excellent barrier properties utilizing laminate [which] *that* can be heat-sealed with its exterior and interior layers being a non-polar constituent (LDPE) and a like non-polar constituent (LDPE)

from front to back. The liquid juice components are insoluble in the polar EVOH material, preventing flavor oil absorption and resulting swelling, stress cracking, plasticization, and heat seal degradation [as] *that* occurs with a thick *layer of* LDPE [as the] *in* contact [layer] *with the juice.*

The preferred laminates of the present invention not only exhibit significant barrier properties to extend the shelf life of the juice, but the laminates can be produced using conventional extrusion equipment.

The preferred embodiments of the present invention are constructed as follows:

Stepwise, the paperboard is flame treated on both sides. Second, a layer of molten LDPE is then placed onto the paperboard substrate by extrusion coating.

Thirdly, the web is turned over and a sandwich layer of EVOH surrounded by Plexar tie layers, or one Plexar tie layer and EVOH, or EVOH alone is coextruded onto the uncoated exposed side of the paperboard substrate. This newly placed layer [is] *may be* corona discharge treated or flame treated to facilitate adhesion of a subsequent food contact layer *LDPE.*

Lastly, a layer of LDPE is extruded onto the interior sandwich layer of Plexar-EVOH-Plexar, or Plexar-EVOH layer or EVOH layer. The completed laminate can now be heat-sealed from front to back (LDPE to LDPE) at conventional temperatures (250° F to 500° F).

The newly formed laminate can then be scored, cut into blanks, folded and side-seam heat-sealed thereon for transport.

Once transported, the prepared blanks can be filled [onto] *using* conventional equipment, such as a [PurePak®] *form-fill-seal* machine made by [Ex-Cell-O]*Pure-Pak, Inc.* The blanks are formed, heat-sealed at the bottom, filled, and heat-sealed at the top [by] *on* the [PurePak®] *form-fill-seal* machine to [complete] *produce* the filled [carton] *cartons.*

The barrier laminates produced by the present invention not only exhibit excellent barrier properties and can be easily constructed, but also meet FDA [approval] *requirements* for use in food packaging. EVAL Company of America's EVAL EP is FDA approved for direct food contact and the preferred ethylene vinyl alcohol copolymer of the invention. Other EVOH's which heat seal at low temperatures (250° F to 500° F) and which can be cut on conventional machinery, could also be used as the barrier material.

Thus, until the advent of the present invention few suitable containers for the containment of citrus juices have been developed which retain the advantages of using paperboard as the base material as well as have a relatively inexpensive barrier layer (EVOH) which can be fabricated using conventional extrusion coating equipment.

The present invention described herein is particularly useful as a paperboard laminate employed in the manufacture of citrus juice or other liquid product containers. Such containers make use of heat-seals for seaming and closing[,]; for example, cartons, folding square or rectangular containers or boxes, and/or even fabricating cylindrical tubes.

The packaging material is printed, converted into flat blanks, side seamed, and then formed, filled, and sealed using conventional carton illing machines. Specifically, the preferred embodiment of the new packaging material, as used to produce 10-ounce, quart, half-gallon and three-quart [PurePak®] *gable-top* cartons, comprises an exterior coating of 12 lbs., LDPE, paperboards of varying thickness (depending on carton size), a coextruded sandwich layer of [4.5 lbs of an adhesive tie material (Plexar 177), 4.0 lbs EVOH (EVAL), 4.5 lbs of a tie layer material (Plexar 177)] , and a product contact coating layer of 10 lbs LDPE.

The second embodiment of the present invention comprises an exterior coating of 0.8 mil LDPE, paperboards of varying thickness (depending on carton size), 0.5 to 0.8 mil adhesive tie layer, 0.2 to 0.7 mil EVOH. and 0.7 mil LDPE (product-contact).

The third embodiment of the present invention comprises an exterior coating of 0.8 mil LDPE, paperboards of varying thickness (depending on carton size), 0.2 to 0.7 mil EVOH, and 0.7 mil LDPE (product-contact).

Prior cartons containing aluminum foil are often expensive relative to the performance problems they present when being form-fill-sealed by the juice packager. Also, the usual thick (22 lb) or (1.5 mil) LDPE product-contact layer generally required in such cartons absorbs citrus flavor/aroma oils, with subsequent deleterious effects on product quality.

The present invention makes use of a relatively inexpensive layer of EVOH, reducing loss of essential oils and vitamin C, while functioning as an excellent barrier. Provided is a very thin (0.7 mil) product-contact layer of LDPE thereby reducing juice absorption in the product-contact layer and resultant degradation of the contact layer.

DETAILED DESCRIPTION OF THE INVENTION

The existing commercial structure for a paperboard carton for juice and similar products has made use of an easily heat-sealed barrier laminate composed of paperboard 4 (FIG. 1) sandwiched between two thick layers of low density polyethylene (LDPE) 2,6 (1.5 mil). The LDPE is an inexpensive heat-sealable material which acts to a limited extent as a moisture barrier to prevent loss of essential oils (flavor) and aroma. The problem encountered with the conventional laminate structure has been that the essential oils of the juice (namely - d-Limonene) have, after short periods of time, been absorbed into the thick 1.5 mil LDPE layer causing heat seal decay, stress cracking, and swelling while stripping the juice of the essential oils. Additionally, the conventional structure (FIG. 1) provides virtually no barrier resistance to oxygen which causes the juice to lose vitamin C in great quantities after a relatively short period of time. To illustrate, the conventional paperboard ½ gallon juice carton will lose 60.5% of its essential oil (d-Limonene) and 84% of its vitamin C content in a storage period of six weeks (SEE TABLE 1).

Figure 1:
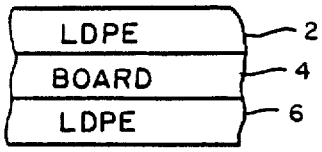
FIG. 1 is a cross-sectional elevation of an existing commercial structure of a laminate.
Figure 2:
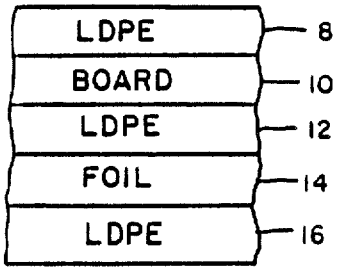
FIG. 2 is a cross-sectional elevation of an existing commercial structure of a laminate.

One conventional existing paperboard carton (FIG. 2) utilizes two extra layers in addition to the layers disclosed in FIG. 1 to add greater barrier resistance to the passage of oxygen and resultant loss of vitamin C. Expensive aluminum foil 14 has been added to the laminate structure to increase the barrier's resistance to the flow of oxygen. An additional thick layer of LDPE 16 is needed to allow the laminate to be heat-sealed from front or back with the exterior LDPE 8 layer. The structure of the barrier laminate (FIG. 2) has poor barrier properties relating to the absorption of essential oils and aromas, since the heat-sealable contacting layer is a thick layer of low density polyethylene. The shelf storage life of the juice carton made up of the barrier laminate of FIG. 2 still exhibits a percentage loss of essential oils (d-Limonene) of 35.5%, while greatly improving its barrier properties with respect to the percentage loss of vitamin C, 24% (See Table 1). The addition of the foil layer allows the laminate to exhibit excellent $O_2$ barrier properties. Although the use of a foil layer is extremely beneficial, the enormous increased expense makes the use of foil economically less desirable.

Figure 3:
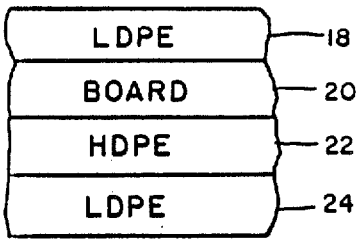
FIG. 3 is a cross-sectional elevation of an existing commercial structure of a laminate.
Figure 4:
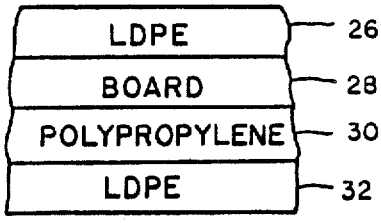
FIG. 4 is a cross-sectional elevation of an existing commercial structure of a laminate.

FIGS. 3 and 4 disclose structures of barrier laminates described in U.S. Pat. No. 4,513,036. FIG. 3 discloses a barrier laminate comprising a sandwich of LDPE 18-paperboard 20-High [Density Polyethylene] *density polyethylene* (HDPE) 22-LDPE 24. The laminate disclosed exhibits large losses of essential oils during its shelf life of six weeks, namely 60.5%, while also exhibiting large losses of vitamin C during the six week period, namely 87% (see Table 1). The economics and ease of fabrication of the laminates of FIG. 3 are outweighed by the poor barrier properties exhibited.

FIG. 4 discloses the preferred embodiment of U.S. Pat. No. 4,513,036, namely a barrier laminate comprising LDPE 26-Paperboard 28-Polypropylene 30-LDPE 32. The additional polypropylene layer 30 and to the barrier properties at relatively low additional costs. The barrier properties still are extremely deficient in resistance to the passage of oxygen and loss of vitamin C, namely 71% after six weeks. The polypropylene laminate structure loses 39.5% of its essential oils (d-Limonene) after six weeks (see Table 1).

Both embodiments disclosed in the patent cited above do not adequately preserve the flavor/aroma and vitamin C content of the juice. The structure of the existing commercial constructions have all faced the same problem due to the necessity for heat sealing the seams and closures while forming the carton blank and while filling the cartons with juice or the like. The necessity of forming a heat seal from the front to the back of the laminate has resulted in the use of a thick exterior layer of LDPE and a thick interior layer of LDPE, both non-polar compounds which exhibit excellent heat-sealing characteristics to one another (see FIGS. 1–4).

Figure 5:
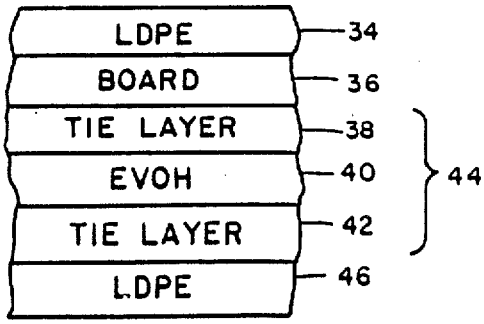
PRIOR ART FIG. 5.
FIG. 5 is a cross-sectional elevation of the preferred embodiment of the laminate of the present invention.

Referring to FIG. 5, the preferred embodiment of the laminate of the present invention is shown as comprising a paperboard substrate 36 of varying thickness which is most suitably high-grade paperboard stock, for example, 282 lb Milk Carton Board, to which is applied on one side a coating of low density polyethylene (LDPE) 34, in a coating weight ranging from about 9 to about 15 pounds per ream. Any commercial extrusion coating grade LDPE is suitable for use herein. On the back or interior portion of the laminate, namely onto the paperboard layer 36, is coextruded a sandwich 44 of a 4.5 lb tie material (Plexar 177) 38/4.0 lb EVOH (EVAL) 40/4.5 lb tie material (Plexar 177) 42. The EVOH being a barrier layer composed of EVAL Company of America's EVAL EP resins. Extruded thereon is a coating of 10 lbs LDPE 46.

Figure 6:
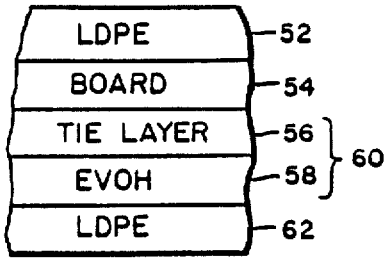
FIG. 6 is a cross-sectional elevation of an alternate embodiment of the laminate of the present invention.

Referring to FIG. 6, the alternate embodiment of the laminate of the present invention is shown as comprising a paperboard substrate 54 of varying thickness which is suitably high grade paperboard stock, i.e., 282 lb milk carton board, to which is applied on one side a very thin 0.8 mil coating of low density polyethylene (LDPE) 52, in a coating weight range averaging 12 lbs per 3000 square feet. Any commercial extrusion coating grade LDPE is suitable for use herein. On the back or interior portion of the laminate, namely onto the paperboard layer 54, a (Plexar 177) tie layer 56 and a layer of 0.2 to 0.7 mil of EVOH 56 are applied by coextrusion. The EVOH being a barrier layer composed of EVAL Company of America's EVAL EP resins. Extrusion coated thereon is a very thin 0.7 mil layer 58 of a non-polar LDPE.

Figure 7:
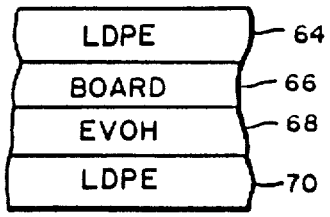
FIG. 7 is a cross-sectional elevation of an alternate embodiment of the laminate of the present invention.

Referring to FIG. 7, a third embodiment of the laminate of the present invention is shown as comprising a paperboard substrate 66 of varying thickness which is suitably high grade paperboard stock, i.e. 282 lb milk carton board, to which is applied on one side a very thin 0.8 mil coating of LDPE 64, a 0.2 to 0.7 mil layer of EVOH 68 is applied by extrusion coating. Extrusion coated thereon is a thin layer 70 of a non-polar LDPE.

Figure 8:
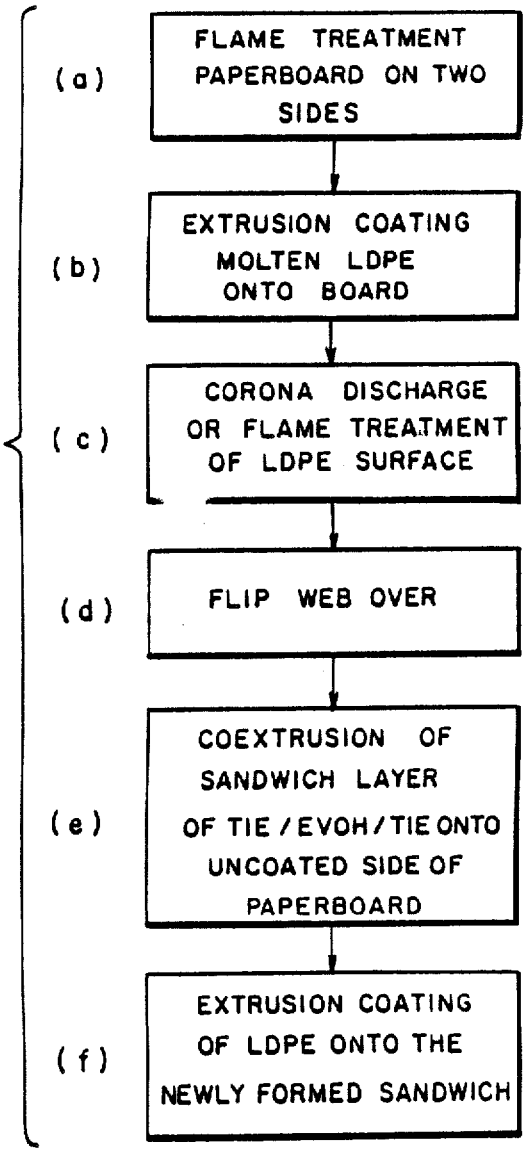
FIG. 8 is a block diagram representing the process for making the preferred embodiment of the laminate of the present invention.

Referring now to FIG. 8, wherein a block diagram discloses the method of forming the heat-sealable barrier laminate of FIG. 5.

The laminate can be easily fabricated. In Step A, the paperboard is flame treated two sides. Step B, a molten layer of the LDPE 34 is extrusion coated onto the paperboard substrate 36. Stop C, the LDPE layer 34 is corona discharge or flame treated in preparation for subsequent printing. Step D, the web is turned over to facilitate Step E, which has a sandwich layer 44 of Plexar 38/EVAL 40/Plexar 42 coextruded onto the paperboard substrate 36. In Step F, extrusion coating of a layer of LDPE 46 onto the sandwich layer 44 completes the laminate.

Figure 9:
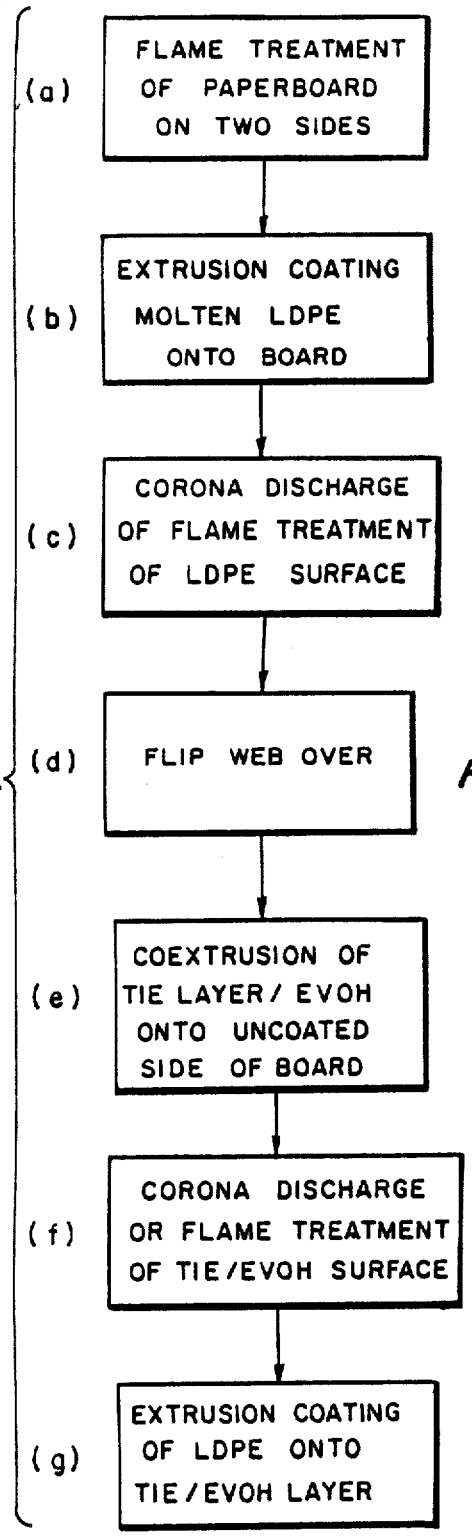
FIG. 9 is a block diagram representing the process for making the alternate embodiment of the laminate of the present invention.

Referring now to FIG. 9, wherein a block diagram discloses the method of forming the heat sealable barrier laminate of FIG. 6.

In Step A, the paperboard is flame treated on two sides. Step B, a molten layer of LDPE 52 is extrusion coated onto the paperboard substrate 54. Step C, the LDPE layer 52 is corona discharge or flame treated to provide subsequent inner layer adhesion. Step D, the web is turned over to facilitate Step E, which has a layer of molten tie layer 56 and EVOH 56 coextruded onto the paperboard substrate 54. Step F, the tie/EVOH layer 60 has its surface corona discharge treated or flame treated to facilitate the adhesion of a subsequent interior product-contact thin LDPE coating 62 to complete the laminate.

Figure 10:
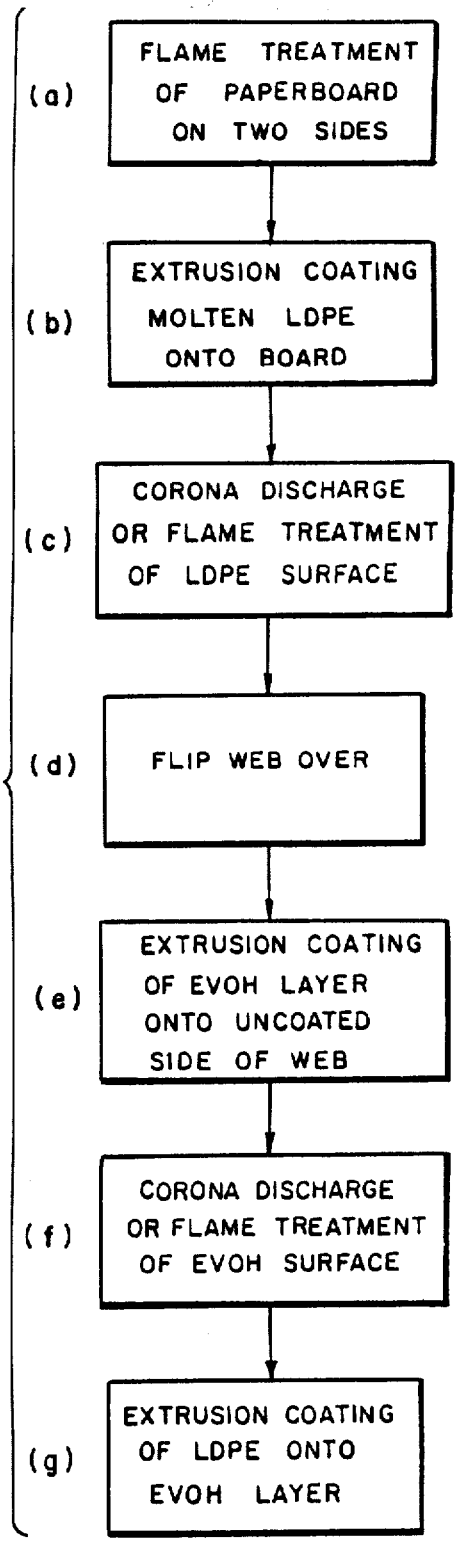
FIG. 10 is a block diagram representing the process for making the alternate embodiment of the laminate of the present invention.

Referring now to FIG. 10, wherein a block diagram discloses the method of forming the heat-sealable barrier laminate of FIG. 7.

In Step A, the paperboard 66 is flame treated on two sides. Step B, a layer of LDPE 64 is extrusion coated onto the paperboard substrate 66. Step C, the LDPE layer 64 is corona discharge or flame treated to provide subsequent inner layer adhesion. Step D, the web is turned over to facilitate Step E, which has a layer of molten EVOH 68 extrusion coated onto the paperboard substrate 66. Step F, EVOH layer 68 is corona discharge treated or flame treated to facilitate the adhesion of a subsequent interior product-contact thin LDPE coating to complete the laminate.

Although specific coating techniques have been described, any appropriate technique for applying the layers onto the paperboard substrate can be suitably employed, such as extrusion, coextrusion, or adhesive lamination [or] *of* single and/or multilayer films to paperboard to achieve the stated inventions of this patent.

The unique barrier effect provided by the laminate of the present invention to the % loss of essential oils and to the % loss of vitamin C is clearly demonstrated by the following example outlined in Table 1.

Standard [½] *half* gallon juice containers were prepared and filled with juice. A typical essential oil in the juice was [d-Limonene] *d-limonene*. The filled cartons were stored for a test period of six weeks after which the juice was analyzed to determine the percentage loss by weight of the essential oil d-Limonene and the percentage loss by weight of vitamin C.

All weights *shown* in lbs are given [in] *as* lbs per 3000 square feet.

TABLE 1

| Test Sample ½ Gallon Juice Container | % Loss of Essential Oil | % Loss of [Essential Oil] Vitamin C |
|---|---|---|
| LDPE/BOARD/LDPE (FIG. 1) | 60.5 | 84 |
| LDPE/BOARD/LDPE/FOIL/LDPE (FIG. 2) | 35.5 | 24 |
| LDPE/BOARD/HDPE/LDPE (FIG. 3) | 60.5 | 87 |
| LDPE/BOARD/POLYPROPYLENE/LDPE (FIG. 4) | 39.5 | 71 |
| LDPE/BOARD/PLEXAR-EVOH-PLEXAR/LDPE (FIG. 5) | 16.5 | 46 |

It can be clearly seen that the container prepared from a laminate of the present invention provides an almost complete barrier to the loss of essential oils far greater than has been present in existing structures. Additionally, the oxygen passage or percentage loss of vitamin C has been greatly reduced over all prior laminates not containing aluminum foil.

The effectiveness of the laminate of the present invention as a barrier to migration of essential oils and flavors, as well as a barrier to a loss of vitamin C permits a significant extension of shelf life of *juice products packaged in* containers constructed therefrom.

What is claimed is:

1. A container for liquids containing essential oils and flavors, *said container having an interior and an exterior,* said container constructed from a laminate comprising:

(a) a paperboard substrate *with inner and outer surfaces, said inner surface being closer to the interior of the container than said outer surface;*

(b) a 12 lb. outer layer of a heat-sealable low density polyethylene polymer [coated on] *exterior to* to said outer surface of said paperboard substrate;

(c) [an inner] *a coextruded* sandwich layer comprising a 4.5 lb. tie layer, a 4.0 lb. heat-sealable ethylene vinyl alcohol copolymer layer and a 4.5 lb. tie layer [extruded on] *interior to* said inner surface of said paperboard substrate; and (d) a product-contact layer of a 10 lb. heat-sealable low density polyethylene polymer [coextruded onto] *interior to* said outer surface of said inner sandwich layer of tie layer—ethylene vinyl alcohol copolymer—tie layer whereby said laminate can be heat-sealed on conventional equipment at temperatures ranging from 250° F–500° F.

2. The container as claimed in claim 1 wherein said outer layer of low density polyethylene polymer is corona discharge treated to enhance printability of said laminate.

3. The container as claimed in claim 1 wherein said outer layer of low density polyethylene polymer is flame treated to enhance printability of said laminate.

4. The container as claimed in claim 1 wherein said tie layer is [a Plexar] *an ethylene based copolymer with functional groups.*

5. A container for liquids containing essential oils and flavors, *said container having an interior and an exterior,* said container constructed from a laminate comprising:

(a) a paperboard substrate *with inner and outer surfaces, said inner surface being closer to the interior of the container than said outer surface;*

(b) a thin 0.8 mil thick outer layer of a heat-sealable low density polyethylene polymer [coated on] *exterior to* said outer surface of said paperboard substrate;

(c) [an inner] *a coextruded* thin tie layer and a 0.2 to 0.7 mil thick layer of a heat-sealable ethylene vinyl alcohol copolymer, [coextruded on] *interior to* said inner surface of said paperboard substrate, *said heat-sealable ethylene vinyl alcohol copolymer layer being interior to said tie layer*; and (d) a thin 0.7 mil thick *product contact* layer of a heat-sealable low density polyethylene polymer [coated on an outer surface of] *interior to* said [tie material-] ethylene vinyl alcohol copolymer layer whereby said laminate can be heat-sealed on conventional equipment at temperatures ranging from 250° F–500° F.

6. The container as claimed in claim 5 wherein said outer layer of low density polyethylene polymer is corona discharge treated to enhance printability of said laminate.

7. The container as claimed in claim 5 wherein said outer layer of low density polyethylene polymer is flame treated to enhance printability of said laminate.

8. The container as claimed in claim 6 wherein said surface of said inner layer of said heat-sealable ethylene vinyl alcohol copolymer is corona discharge treated to enhance adhesion of said thin heat-sealable LDPE layer.

9. The container as claimed in claim 7 wherein said surface of said inner layer of said heat-sealable ethylene vinyl alcohol copolymer is flame treated to enhance adhesion of said heat-sealable LDPE layer.

10. A container for liquids containing essential oils and flavors, *said container having an interior and on exterior,* constructed from a laminate comprising:

(a) a paperboard substrate *with inner and outer surfaces, said inner surface being closer to the interior of the container than said outer surface;*

(*b*) a thin 0.8 mil thick outer layer of a heat-sealable low density polyethylene polymer [coated on] *exterior to* said outer surface of said paperboard substrate;

(c) an inner tie layer [of an ethylene acrylic acid coated on] *interior to* said inner surface of said paperboard substrate;

(d) a 0.2 to 0.7 mil thick ethylene vinyl alcohol copolymer layer [coated on] *interior to* said tie layer; and (e) a thin 0.7 mil thick heat-sealable layer of low density polyethylene polymer [coated on] *interior to* said [outer surface of said EVOH] *ethylene vinyl alcohol copolymer layer whereby said laminate can be heat-sealed on conventional equipment at temperatures ranging from 250° F–500° F.*

11. The container as claimed in claim 10 wherein said outer layer of low density polyethylene polymer is corona discharge treated to enhance printability of said laminate.

12. The container as claimed in claim 10 wherein said outer layer of low density polyethylene polymer is flame treated to enhance printability of said laminate.

13. The container as claimed in claim 11 wherein said inner layer of ethylene vinyl alcohol copolymer is corona discharge treated to enhance adhesion of said subsequent heat-sealable LDPE coating.

14. The container as claimed in claim 12 wherein said inner layer of ethylene vinyl alcohol copolymer is flame treated to enhance adhesion of said subsequent heat-sealable LDPE coating.

*15. The container as claimed in claim 5 wherein said tie layer is an ethylene based copolymer with functional groups.*

*16. The container as claimed in claim 10 wherein said tie layer is an ethylene based copolymer with functional groups.*

*17. A container for liquids containinq essential oils and flavors, said container having an interior and an exterior, said container constructed from a laminate comprising:*

*(a) a paperboard substrate with inner and outer surfaces, said inner surface being closer to the interior of the container than said outer surface;*

*(b) a thin outer layer of a heat-sealable low density polyethylene polymer exterior to said outer surface of said paperboard substrate;*

*(c) a coextruded sandwich layer comprising a 4.5 lb. tie layer, a 4.0 lb. heat-sealable ethylene vinyl alcohol copolymer layer and a 4.5 lb. tie layer interior to said inner surface of said paperboard substrate; and*

*(d) a product-contact layer of a heat-sealable low density polyethylene poltmer interior to said outer surface of said inner sandwich layer of tie layer—ethylene vinyl alcohol copolymer—tie layer whereby said laminate can be heat-sealed on conventional equipment at temperatures ranging from 250° F–500° F.*

*18. The container as claimed in claim 17 wherein said outer layer of low density polyethylene polymer is corona discharge treated to enhance printability of said laminate.*

*19. The container as claimed in claim 17 wherein said outer layer of low density polyethylene polymer is flame treated to enhance printability of said laminate.*

*20. The container as claimed in claim 17 wherein said tie layer is an ethylene based copolymer with functional groups.*

*21. A container for liquids containing essential oils and flavors, said container having an interior and an exterior, said container constructed from a laminate comprising:*

*(a) a paperboard substrate with inner and outer surfaces, said inner surface being closer to the interior of the container than said outer surface;*

*(b) a thin outer layer of a heat-sealable low density polyethylene polymer exterior to said outer surface of said paperboard substrate,*

*(c) a coextruded thin tie layer and a 0.2 to 0.7 mil thick layer of a heat-*sealable ethylene vinyl alcohol copolymer, interior to said inner surface of said paperboard substrate, said heat-*sealable ethylene vinyl alcohol copolymer layer being interior to said tie layer; and*

*(d) a thin product contact layer of a heat-sealable low density polyethylene polymer interior to said ethylene vinyl alcohol copolymer layer whereby said laminate can be heat-sealable on conventional equipment at temperatures ranging from 250° F–500° F.*

*22. The container as claimed in claim 21 wherein said outer layer of low density polyethylene polymer is corona discharge treated to enhance printability of said laminate.*

*23. The container as claimed in claim 21 wherein said outer layer of low density polyethylene polymer is flame treated to enhance printability of said laminate.*

*24. The container as claimed in claim 22 wherein said surface of said inner layer of said heat-sealable ethylene vinyl alcohol copolymer is corona discharge treated to enhance adhesion of said thin heat-sealable LDPE layer.*

*25. The container as claimed in claim 23 wherein said surface of said inner layer of said heat-sealable ethylene vinyl alcohol copolymer is flame treated to enhance adhesion of said heat-sealable LDPE layer.*

*26. The container as claimed in claim 21 wherein said tie layer is an ethylene based copolymer with functional groups.*

*27. A container for liquids containing essential oils and flavors, said container having an interior and on exterior, constructed from a laminate comprising:*

*(a) a paperboard substrate with inner and outer surfaces, said inner surface being closer to the interior of the container than said outer surface;*

*(b) a thin outer layer of a heat-sealable low density polyethylene polymer exterior to said outer surface of said paperboard substrate:*

*(c) an inner tie layer interior to said inner surface of said paperboard substrate:*

*(d) a 0.2 to 0.7 mil thick ethylene vinyl alcohol copolymer layer interior to said tie layer: and*

*(e) a thin heat-sealable layer of low density polyethylene polymer interior to said ethylene vinyl alcohol copolymer layer whereby said laminate can be heat-sealable on conventional equipment at temperatures ranging from 250° F–500° F.*

*28. The container as claimed in claim 27 wherein said outer layer of low density polyethylene polymer is corona discharge treated to enhance printability of said aminate.*

*29. The container as claimed in claim 27 wherein said outer layer of low density polyethylene polymer is flame treated to enhance printability of said laminate.*

*30. The container as claimed in claim 28 wherein said inner layer of ethylene vinyl alcohol copolymer is corona discharge treated to enhance adhesion of said subsequent heat-sealable LDPE coating.*

*31. The container as claimed in claim 29 wherein said inner layer of ethylene vinyl alcohol copolymer is flame*

*treated to enhance adhesion of said subsequent heat-sealable LDPE coating.*

*32. The container as claimed in claim 27 wherein said tie layer is an ethylene based copolymer with functional groups.*

*33. A container for liquids containing essential oils and flavors, said container having an interior and an exterior, said container constructed from a laminate comprising:*

*(a) a paperboard substrate with inner and outer surfaces, said inner surface being closer to the interior of the container than said outer surface;*

*(b) a thin outer layer of a heat-sealable, low density polyethylene polymer exterior to said outer surface of said paperboard substrate;*

*(c) a 0.2 to 0.7 mil thick ethylene vinyl alcohol copolymer layer interior to said inner surface of said paperboard substrate; and*

*(d) a thin heat-sealable layer of low density polyethylene polymer interior to said ethylene vinyl alcohol copolymer layer whereby said laminate can be heat-sealed on conventional equipment at temperatures ranging from 250° F.–500° F.*

*34. The container as claimed in claim 33 wherein said outer layer of low density polyethylene polymer is corona discharged treated to enhance printability of said laminate.*

*35. The container as claimed in claim 33 wherein said outer layer of low density polyethylene polymer is flame treated to enhance printability of said laminate.*

*36. The container as claimed in claim 34 wherein said inner layer of ethylene vinyl alcohol copolymer is corona discharged treated to enhance adhesion of said subsequent heat-sealable low density polyethylene polymer coating.*

*37. The container as claimed in claim 35 wherein said inner layer of ethylene vinyl alcohol copolymer is flame treated to enhance adhesion of said subsequent heat-sealable low density polyethylene polymer coating.*

*38. A container for liquids containing essential oils and flavors, said container from a laminate comprising:*

*(a) a paperboard substrate with inner and outer surfaces, said inner surface being closer to the interior of the container than said outer surface;*

*(b) a thin 0.8 mil thick outer layer of a heat-sealable low density polyethylene polymer exterior to said outer surface of said paperboard substrate;*

*(c) a 0.2 to 0.7 thick ethylene vinyl alcohol copolymer layer interior to said inner surface of said paperboard substrate; and*

*(d) a thin 0.7 mil thick heat-sealable layer of low density polyethylene polymer interior to said ethylene vinyl alcohol copolymer layer whereby said laminate can be heat-sealed on conventional equipment at temperatures ranging from 250° F.–500° F.*

*39. The container as claimed in claim 38 wherein said outer layer of low density polyethylene polymer is corona discharged treated to enhance printability of said laminate.*

*40. The container as claimed in claim 38 wherein said outer layer of low density polyethylene polymer is flame treated to enhance printability of said laminate.*

*41. The container as claimed in claim 39 wherein said inner layer of ethylene vinyl alcohol copolymer is corona discharged treated to enhance adhesion of said subsequent heat-sealable low density polyethylene polymer coating.*

*42. The container as claimed in claim 40 wherein said inner layer of ethylene vinyl alcohol copolymer is flame treated to enhance adhesion of said subsequent heat-sealable low density polyethylene polymer coating.*

* * * * *